United States Patent

[11] 3,550,669

| [72] | Inventors | Axel Lippert;<br>Ludwig Bottenbruch, Krefeld Bockum;<br>Clemens Casper, Krefeld; Otto Court,<br>Neuss; Hugo Vernaleken, Krefeld,<br>Germany |
|---|---|---|
| [21] | Appl. No. | 754,629 |
| [22] | Filed | Aug. 22, 1968 |
| [45] | Patented | Dec. 29, 1970 |
| [73] | Assignee | Farbenfabriken Bayer Aktiengesellschaft<br>Leverkusen, Germany<br>a corporation of Germany |
| [32] | Priority | Sept. 4, 1967 |
| [33] | | Germany |
| [31] | | No. F53404 |

[54] APPARATUS FOR CARRYING OUT EVAPORATIONS AND REACTIONS ACCOMPANIED BY THE EVOLUTION OF GASES
3 Claims, 3 Drawing Figs.

[52] U.S. Cl. .................................................... 159/6, 202/236
[51] Int. Cl. ...................................................... B01d 1/22
[50] Field of Search............................................ 159/6, 13(For), 47(For), 28C(For); 23/270, 273; 165/154, 168, 169; 202/236, 238, 157, 189, 262; 203/89, 90

[56] References Cited

UNITED STATES PATENTS

| 3,063,925 | 11/1962 | Huet | 204/193.2 |
| 3,497,422 | 2/1970 | Levite | 202/236X |
| 2,411,186 | 11/1946 | Boeckeler | 159/47 |
| 2,554,138 | 5/1951 | Cross | 159/27A |
| 2,606,146 | 8/1952 | Luten, Jr. | 202/236X |
| 2,182,566 | 12/1939 | Lavigne | 203/90X |

FOREIGN PATENTS

| 398 | 1890 | Great Britain | 159/28C |
| 259,497 | 10/1926 | Great Britain | 159/5 |
| 1,020,470 | 2/1966 | Great Britain | 159/6 |
| 499,586 | 1/1939 | Great Britain | 203/80 |
| 698,246 | 10/1953 | Great Britain | 203/89 |

Primary Examiner—Norman Yudkoff
Assistant Examiner—J. Sofer
Attorney—Burgess, Dinklage and Sprung ABSTRACT: In apparatus for the evaporation of a component of a liquid mixture, the mixture is injected through an expansion nozzle into the upper end of a vertical helical coil and flows downwardly there through under the influence of gravity with the vapor phase also helping to urge the liquid phase through the coil, the liquid phase thus being subjected to centrifugal force, there being means provided for heating the liquid phase as it passes through said coil; the coil discharges into a conventional liquid-vapor separator.

INVENTORS:
AXEL LIPPERT, LUDWIG BOTTENBRUCH, CLEMENS CASPER, OTTO COURT, HUGO VERNALEKEN.

APPARATUS FOR CARRYING OUT EVAPORATIONS AND REACTIONS ACCOMPANIED BY THE EVOLUTION OF GASES

The treatment of viscous liquids involves techniques in which mechanical means such as screws, thin-film evaporators and so on have to be used. Mixing and expansion are both complicated by the viscosity of the product. The bubbles formed during the evaporation of multicomponent mixtures encounter considerable difficulty in reaching the surface of evaporation and in most cases only burst under considerable difficulty due to excessive surface interface tensions. Accordingly, the time required to obtain specific effects is increased with increasing viscosity to the point that apparatus with fairly long retainment times are necessary, causing damage to the products. Generally speaking, it is possible by increasing the output of the products to shorten the retainment time, provided the chemical reaction time does not prevent this.

The use of machines with rotating parts as apparatus for carrying out the processes always involves a high capital investment and equally high maintenance costs. For this reason, there is a growing need for apparatus which do not contain internally sealed rotating parts, stuffing boxes and other mechanical components that are difficult to control.

The use of an ordinary flow pipe or tube is often unsuccessful due to the peculiarity of the material, its tendency to flow in layers or, in the case of two-phase flow, to agglomerate in the form of balls and bubbles, resulting inevitably in an irregular phase separation.

In addition to such machines as screws, coils, stirrers, thin-film evaporators, so-called tubular evaporators such as expansion evaporators and gravity-flow evaporators have been used in particular for evaporation purposes and for degasification purposes, for example, in polycondensation. As the product increases in viscosity, there is a tendency in evaporators of this kind for the product to be nonuniformly desegregated, resulting in the formation of plugs with gas pockets trapped inside them which are pushed very quickly through the tube (at the rate of flow of the gas) and are ejected at the end thereof. As a result, the retainment time inside the tube is often too short. Alternatively, extremely long tubes with a correspondingly large pressure drops or high pressure drops are used. The retainment time distribution is wide. A nonuniform product is obtained which is a considerable disadvantage in polymerization and polycondensation reactions in particular. Since the bubbles and plugs are irregularly formed, fluctuating pressure gradients are developed, making uniform evaporation totally impossible.

At high rates of vapor flow, drops isolated from the flow of product are formed, being carried along more quickly in the vapor stream than those adhering to the wall are subjected to a different evaporation mechanism.

These disadvantages can be obviated if, in accordance with the invention, the product sprayed from the nozzle is separated into vapor and liquid phases during evaporation by centrifugal forces and if this separation effect is maintained throughout the process of evaporation by feeding the two-phase flow along a coiled or helical channel, wherein the liquid phase would be carried along by the vapor phase which moves at a considerably higher rate of flow.

In the preferred embodiment of the invention, the liquid phase is advantageously heated and the vapor phase cooled.

The apparatus according to the invention for carrying out the process is distinguished by the fact that a helical or curved channel is formed between two heating jackets arranged one inside the other, an expansion nozzle being provided at the inlet end of this channel and a separator adjoining its outlet end. Through the release of pressure in the expansion nozzle, a spray jet or stream which continuously changes direction in the channel is formed as a result of evaporation. Consequently, despite the high rate of vapor flow required to carry viscous liquids along in the form of layers in the proximity of walls, the sprayed drops are deposited on the outer wall from which they accumulate in this kind of channel flow and, driven by the vapor stream, flow through the channel like a film or rivulet, depending upon the particular geometry of the apparatus and upon the flow conditions prevailing therein. In the special case of downward flow, the product may be drained off through a sink under certain flow conditions. It is possible to adjust any desired flow pattern by designing the channel geometry in such a way that it is adapted to the particular mass flows and to their physical data, so that optimal allowance can be made for heat and material transport operations. The product flows through the reactor with an extremely uniform retainment time and is continuously recirculated through secondary means (not shown).

The result obtained is no bubbles or balls are formed and a gas channel is constantly free at the core of the channel over its entire length. As a result, a highly uniform pressure drop is also obtained. Thus, evaportions which have to be carried out carefully can be carried out in such a way as to increase gradually by adapting the apparatus to a reduction in pressure which progresses with the evaporation process. It is possible in this way to avoid foam formation in the first part of the evaporation process, and decomposition in the final stages of the process.

If a two- or multicomponent liquid mixture is separated in the process of evaporation, it is possible to heat that side of the channel on which the liquid phase flows, whilst that side reserved for the gas phase is cooled so that the higher temperature boiling component is condensed out and, due to the centrifugal force developed by the helical flow, is returned to the outer wall where it combines with the volatilizing liquid. It is possible through the reevaporation simultaneously to obtain a catalytic effect, such as, for example, in the case of simultaneously reacting materials, to prevent the reaction from being inhibited through a lack of one component.

According to the invention, the apparatus is provided for this purpose with a separate heating system for each of the two heating jackets defining the sidewalls of the channel.

The cross section of the channel preferably increases towards the outlet end corresponding to the requirements of evaporation and flow.

In order to prevent liquid from accumulating in sinks at the bottom of the channel, the bottom of the channel is designed to permit the liquid to fall away at a greater rate of flow than that corresponding to the flow in the channel. Allowance must be made for the various rates of liquid flows that occur in choosing the angle of inclination.

Two embodiments of the apparatus according to the invention are discussed by way of example in the following with reference to the accompanying drawings, wherein.

Figure 1:
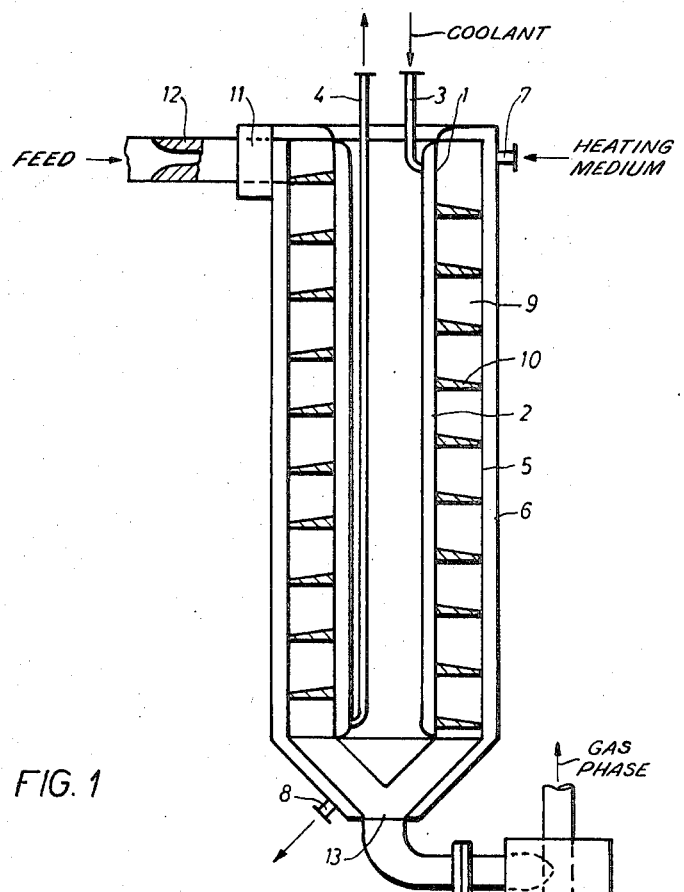
FIG. 1 is a longitudinal section through one embodiment of the apparatus.

An inner channel sidewall 1 is provided with an interior heating jacket 2 which has an inlet 3 and an outlet 4. An outer channel sidewall 5 is surrounded by an exterior heating jacket 6 and has an inlet 7 and an outlet 8. A channel 9 therefore is defined with an outwardly inclined base 10 arranged between the inner and outer channel sidewalls 1 and 5. The channel 9 may have any suitable cross section, for example circular, elliptical, square, rectangular or otherwise. The expansion nozzle 12 is provided at the inlet end 11 of the channel 9. The outlet end 13 is adjoined by a separator 14 which separates the vapor phase from the liquid phase.

Figure 2:
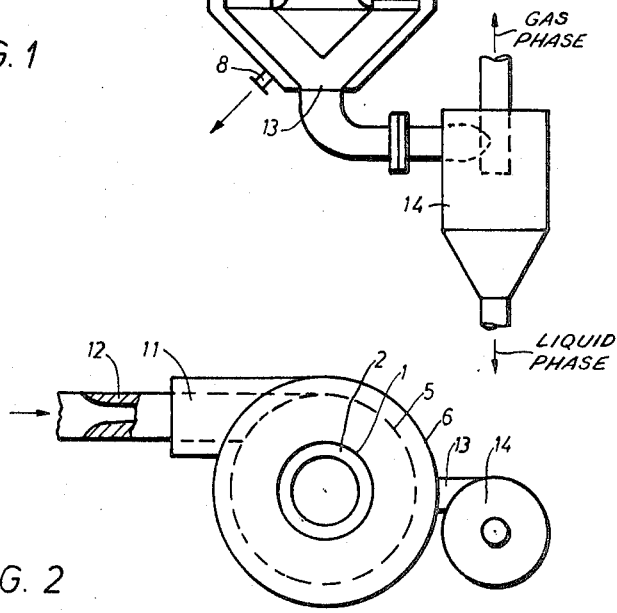
FIG. 2 is a top view of this first embodiment.

FIG. 2 shows the tangential opening of the inlet pipe 11.

Figure 3:
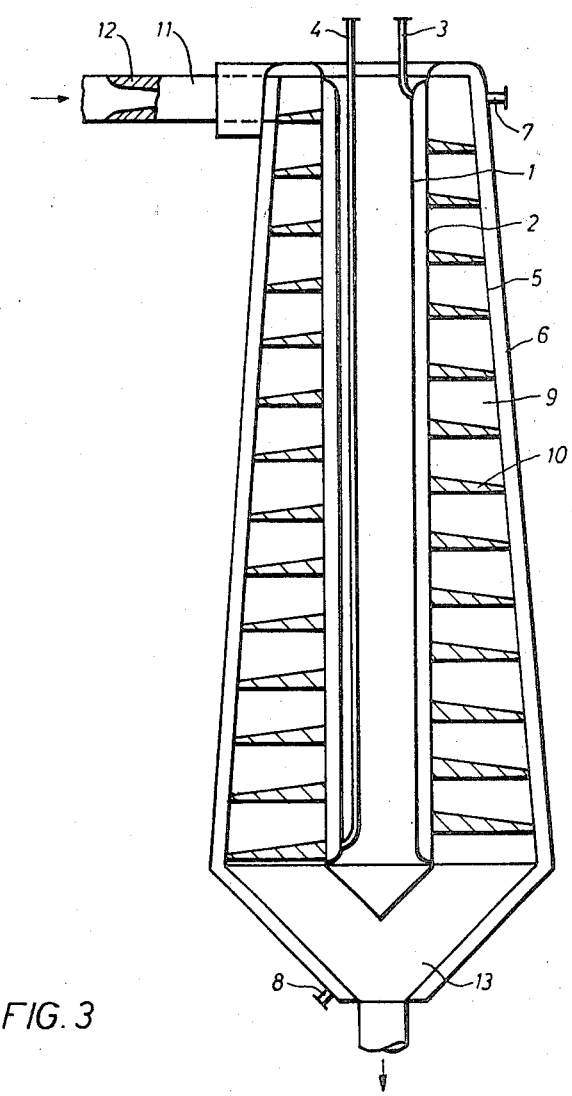
FIG. 3 is a longitudinal section through another embodiment of the apparatus.

As shown in FIG. 3, the outer channel sidewall 5 slants outwardly as the multiphase substance flows towards the outlet end 13 such that the cross section of the channel 9 increases accordingly.

We claim:

1. In apparatus adapted to evaporate and effect separation of a liquid mixture wherein said mixture is passed through an expansion nozzle into the inlet of a channel and in passing therethrough from a zone of higher pressure to a zone of lower pressure at the outlet separates into a vapor and liquid phase which are recovered from said outlet of said channel via a vapor-liquid separator, the improvement comprising; said channel being comprised of a continuous coil of fixed contiguous loops helical about a substantially perpendicular axis, said expansion nozzle discharging tangentially into the upper inlet end thereof, said liquid phase being propelled by gravity and by said vapor phase moving at a considerably higher rate of flow downwardly along said channel to said outlet and being subjected to centrifugal force as a result of the helical shape of said channel, and comprising in addition heat exchange means about said coils adapted to heat said liquid phase as the same is propelled along said channel.

2. The apparatus of claim 1 wherein said heat exchange means comprises a hollow-tubular jacket about and in heat exchange contact with the periphery of the helix formed by said channel and means for supplying a heating medium to and removing the same from said hollow-tubular jacket, and in addition second heat exchange means comprising a second hollow-tubular jacket within and in heat exchange contact with the interior of the helix formed by said channel and means for supplying a cooling medium to and removing the same from said second hollow-tubular jacket.

3. The apparatus of claim 1 wherein the cross-sectional area of said channel increases from said inlet to said outlet.